US007938318B2

(12) United States Patent  (10) Patent No.: US 7,938,318 B2
Fein et al.  (45) Date of Patent: May 10, 2011

(54) SYSTEM AND METHOD FOR CONTROLLING SECURED TRANSACTION USING DIRECTIONALLY CODED ACCOUNT IDENTIFIERS

(75) Inventors: Gene S Fein, Lenox, MA (US); Edward Merritt, Lenox, MA (US)

(73) Assignee: Intellectual Ventures Holding 32 LLC, Las Vegas, NV (US)

( * ) Notice: Subject to any disclaimer, the term of this patent is extended or adjusted under 35 U.S.C. 154(b) by 589 days.

(21) Appl. No.: 11/695,980

(22) Filed: Apr. 3, 2007

(65) Prior Publication Data
US 2008/0245855 A1 Oct. 9, 2008

(51) Int. Cl.
G06K 5/00 (2006.01)
G06Q 20/00 (2006.01)
B42D 15/00 (2006.01)

(52) U.S. Cl. ............ 235/380; 235/375; 283/61; 283/62; 283/904; 705/18

(58) Field of Classification Search .................. 235/380; 705/18
See application file for complete search history.

(56) References Cited

U.S. PATENT DOCUMENTS

| | | | | |
|---|---|---|---|---|
| 2,162,946 | A * | 6/1939 | Garrison | 273/304 |
| 3,752,904 | A * | 8/1973 | Waterbury | 725/25 |
| 5,259,649 | A * | 11/1993 | Shomron | 283/114 |
| 5,369,261 | A | 11/1994 | Shamir | |
| 5,517,558 | A * | 5/1996 | Schalk | 379/88.02 |
| 5,955,961 | A * | 9/1999 | Wallerstein | 340/5.4 |
| 7,225,994 | B2 * | 6/2007 | Finkelstein | 235/493 |
| 2002/0171662 | A1 | 11/2002 | Lee | |
| 2003/0069846 | A1 | 4/2003 | Marcon | |
| 2003/0091204 | A1 | 5/2003 | Gibson | |
| 2004/0030659 | A1 * | 2/2004 | Gueh | 705/67 |
| 2004/0041026 | A1 | 3/2004 | Tani | |
| 2006/0027662 | A1 | 2/2006 | Baradi | |
| 2006/0119901 | A1 * | 6/2006 | Ehrenfeld et al. | 358/474 |
| 2007/0136193 | A1 * | 6/2007 | Starr | 705/41 |
| 2007/0188299 | A1 | 8/2007 | Blum | |
| 2008/0301015 | A1 | 12/2008 | Griffin et al. | |

OTHER PUBLICATIONS

USPTO; File History for U.S. Appl. No. 11/695,984 to Fein, filed Apr. 3, 2007.
ISO/IEC 11693:2005.
ISO/IEC 11694-6:2006.
USPTO; Office Action for U.S. Appl. No. 11/695,984; mailed Jun. 1, 2010.
Prosecution History for U.S. Appl. No. 11/695,984, filed Apr. 3, 2007.
Stolowitz Ford Cowger LLP, Listing of Related Cases, Nov. 17, 2010.

* cited by examiner

*Primary Examiner* — Michael G Lee
*Assistant Examiner* — Laura Gudorf
(74) *Attorney, Agent, or Firm* — Stolowitz Ford Cowger LLP

(57) ABSTRACT

A control method and system provides coded access to a system by acquiring account identification data corresponding to a combination of a plurality of symbols. The account identification data is transmitted, for example to a remote server, to correlate the account identification data against an account database to evaluate corresponding account information. Based on the account information, access to the system may be controlled.

30 Claims, 10 Drawing Sheets

CREDIT CARD FRONT

SYSTEM AND METHOD FOR CONTROLLING SECURED TRANSACTION USING DIRECTIONALLY CODED ACCOUNT IDENTIFIERS

BACKGROUND OF THE INVENTION

Credit and debit cards are widely used to conduct commerce across the globe. The current credit card system has been largely based on a coding of alphanumeric characters on the front of the card that make up the credit card account numbers, along with characters on the front and back of the cards or other security devices such as holographic stickers to provide secondary security and identification measures. Magnetic stripes on the back of cards are also a common feature. These stripes are used to encode a secure, unique digital data sequence that is read by the electronic magnetic card reader stripe swiping system and used to validate the card at manned and automated retail checkout counters. In utilizing these basic systems, as well as other systems, the credit card business has enjoyed a business that has grown in size each year with hundreds of billions of dollars spent by consumers with credit and debit cards each year.

The current system for coding and verifying credit card accounts and corresponding security checks is well established. For transactions occurring over the phone, or for online transactions, credit card users often input both their primary card account number, as well as, a secondary account number and an expiration date. Additionally, card account holders may be asked to input their address and sometimes even personal pin numbers. In some cases, they may be asked to answer a personal question stored by the card company, such as the name of their "favorite pet" or their "mother-in-law."

Conventional models address the need to create unique account numbers, and to provide other means to verify those account numbers and their corresponding users. These other means include the use of an expiration date or security code printed on the front and back of a card, or the use of a magnetic stripe holding programmed information. The magnetic stripe is an institutionalized technology in the credit and debit card industry. Today financial cards all follow the ISO standards to ensure read reliability world wide and along with transit cards constitute the largest users of magnetic stripe cards.

The magnetic stripe is written and read in much the same way that audio recording tape is written and read, except that the data are binary digits—1s and 0s—instead of sounds. The magnetic stripe is made of a material that can be magnetized. To write data onto the stripe, the card is dragged over a tiny electromagnet. Pulses of electrical current are pushed through the electromagnet windings in one direction or the other, to magnetize tiny spots on the stripe material. Perhaps one direction of magnetization represents a "1" while the opposite direction represents a "0"; but more likely a slightly more complicated system is used. Companies that deal with these cards have agreed among themselves how to use arrangements of 1s and 0s to represent the letters and numbers that they want to store on the stripe.

To read the data, the card is dragged over a tiny coil of wire. Movement of the magnetized spots past the coil causes small electrical voltages to appear in the coil, and from these voltages the stored 1s and 0s can be deduced. In practice, the coil used to read the stripe is very similar to the electromagnet used to write the stripe. These electromagnets are mounted in "write heads" and "read heads", which typically hold not one but several electromagnets, side by side, so that several "tracks" of magnetized spots are written and read simultaneously.

A standard card employing a magnetic stripe may have any of three tracks, or a combination of these tracks. Track 1 was the first track standardized. This layout was developed by the International Air Transportation Association (IATA) and is still reserved for their use. The layout includes 210 bits per inch ("bpi"), meaning the number or 0s or 1s that one head can write on each inch of stripe, with room for 79 numeric characters. It includes the primary account number (up to 18 digits) and the account holder's name (up to 26 alphanumeric characters).

Track 2 was developed by the American Bankers Association (ABA) for on-line financial transactions. This layout includes 75 bpi with room for 40 numeric characters. It includes the account number (up to 19 digits).

Track 3 is also used for financial transactions. The difference is its read/write ability. The layout includes 210 bpi with room for 107 numeric digits. It also includes an enciphered PIN, country code, currency units, amount authorized, subsidiary account information and other restrictions.

Instead of, or in addition to simply using magnetic stripes that store data, cards may also contain microcontrollers that store data and run programs. These "smartcards" contain an internal microcontroller that runs a program as soon as it is inserted in a smartcard socket. The firmware running in the smartcard is an interpreter with a passive nature, which means that instead of initiating its own actions, it merely responds in a predetermined way to commands sent in from the outside world. Furthermore, like most modern microcontrollers, its program memory can be locked so that it can be neither examined nor modified by any external means. Smartcards generally contain encryption routines built in their firmware. The combination of the three aforementioned characteristics makes these devices particularly well suited for applications requiring high security.

Furthermore, another security measure includes the use of optical memory cards. Optical memory cards use a technology similar to the one used with music CDs or CD ROMs. A panel of the "gold colored" laser sensitive material is laminated in the card and is used to store the information. The material is comprised of several layers that react when a laser light is directed at them. The laser burns a tiny hole (2.25 microns in diameter) in the material which can then be sensed by a low power laser during the read cycle. The presence or absence of the burn spot indicates a "one" or a "zero." Because the material is actually burned during the write cycle, the media is a write once read many (WORM) media and the data is non volatile (not lost when power is removed).

Optical cards can currently store between 4 and 6.6 MB of data which gives the ability to store graphical images (e.g. photographs, logos, fingerprints, x-rays, etc.). The data is encoded in a linear x-y format. ISO/IEC 11693 and 11694 standards provide details regarding the encoding format. The primary users of optical technology today are: the medical and healthcare industry; prepaid debit cards; cargo manifests; admission pass season tickets; auto maintenance records; and retail purchase cards and RFID embedded chips to help ensure security, validity and proper use of the credit or debit cards.

SUMMARY OF THE INVENTION

Unfortunately, the existing conventional systems have certain limitations in use and deployment. To start with, an alphanumeric system has certain base limitations due to the number of total characters in use that make up the combination of numbers or letters in an account number. For instance, an alphanumeric character set that includes 36 total characters has exponentially fewer possible combinations than an identification set that includes millions of possible characters. As credit cards suffer billions of dollars per year in fraud and piracy, the idea of extending the number of characters that make up account numbers and security codes may be one way to reduce fraud and piracy.

The magnetic stripe and database elements in the credit card business used as the primary methods to corroborate automatic data collection and identification for credit and debit card users are also long established systems that create few barriers to imposters. Similarly, although the implementation of security measures such as RFID and microprocessor implementation within cards certainly help the situation, these uses are only safeguards against specific types of uses, namely retail transactions, either manned or unmanned. Magnetic stripes, microprocessors and RFID chips installed within credit cards do nothing to stem the flow of online, mail/courier or phone transactions as the magnetic stripes, microprocessor or RFID chip need to be deployed locally to validate the card further.

The existing credit card system, including the basic account number system, has been in place for decades. As a consistent and single platform for the credit and debit card industry, it has also been susceptible for fraudulent attack precisely because it provides an established target to focus upon to find solutions to hack the credit card systems in a variety of ways.

Accordingly, there is a need for a new, integrated system that replaces the well established way to create and code credit cards and debit cards. The new system integrates newer methods into the coding of credit card and debit card accounts, and combines those methods with newer available security measures within the card. The external innovations of this system include redefining the basic database coding elements and programming structure that processes, verifies, communicates and houses credit card data. This system will create the flexibility to define many more account code combinations in a manner that leaves the vast majority of possible account code combinations unused. As the security measures and increased card code combinations of the system are used in tandem, the credit card system as a whole becomes less susceptible to fraud and abuse. Further, the data will be transported by the reader systems in a way that is entirely new, low cost, built in order to add on to existing standards and ensures a higher degree of accuracy and fraud protection while guarding against misuse.

The present invention relates to the creation of a credit, debit or security code system that uses a pool of non-alphanumeric symbols as unique sequenced account identifiers where a match is then sought by the system between the symbols and other corresponding data transmissions to make secure account verifications from central and sub-central data and data verification points. According to principles of the present invention, a method and corresponding system provides coded access to a system by acquiring account identification data corresponding to a combination of a plurality of the non-alphanumeric symbols. The account identification data is transmitted to a remote server to correlate the account identification data against an account database to evaluate corresponding account information. Based on the account information, access to the system may be controlled.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

According to principals of the present invention, a system may use directional symbols, or characters, as available individual coding elements deployed in combination to create a new transactional account management system, such as a credit card, debit card, or gift card system. The symbols may be used to create account identification data, account codes, or what is currently referred to as credit or debit card 'account numbers.'

Figure 1:
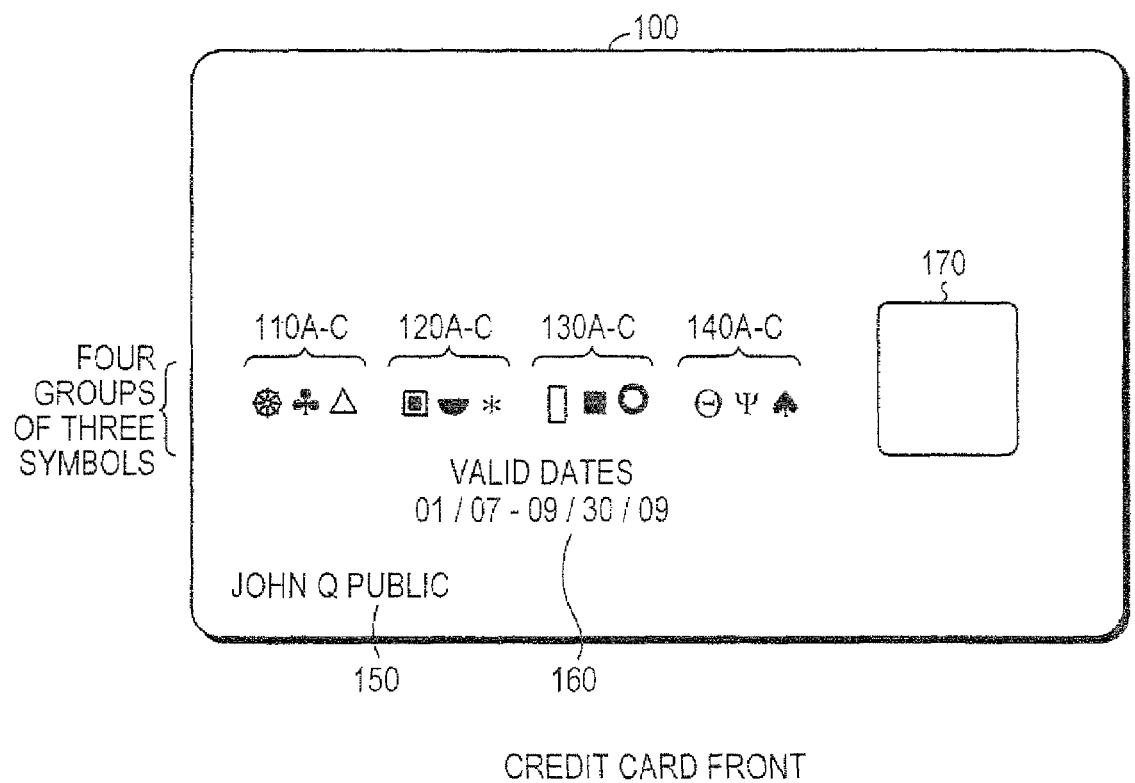
FIG. 1 is a schematic view of the front of a card that may be used in systems according to principles of the present invention.

The front of the cards used in systems according to principles of the present invention are aesthetically pleasing. FIG. 1 illustrates the front of a card 100 that may be used in a system according to principles of the present invention. Typically, a string or series of numerals (written digits) represents the credit or debit card account number. These numerals (digits) may be removed completely from the card. Instead, the numerals may be replaced by a pleasant grouping of symbols, giving the card a "hieroglyphic" effect. The individual symbols used in the system may be stored in a database correlating to respective names, such as "shamrock" or "up arrow" and used in the system as a combination on the credit and debit cards to create individual cardholder account numbers.

In the embodiment shown in FIG. 1, the combination of a plurality of symbols is a combination of twelve symbol arrays, or character arrays. For organizational purposes, the twelve arrays have been arranged in four groups of three symbol arrays 110A-C, 120A-C, 130A-C, and 140A-C. As in typical credit or debit card systems, the front of the card displays the authorized user (account holder) name 150, along with the expiration date 160. In addition to the card having the account number shown encoded with symbols, auxiliary coding for security may also exist, such as a 4-symbol, quick security code element (not shown in FIG. 1). This may be used in tandem with holographic watermarks 170 and other combinations of security measures already existing in the art.

Figure 2:
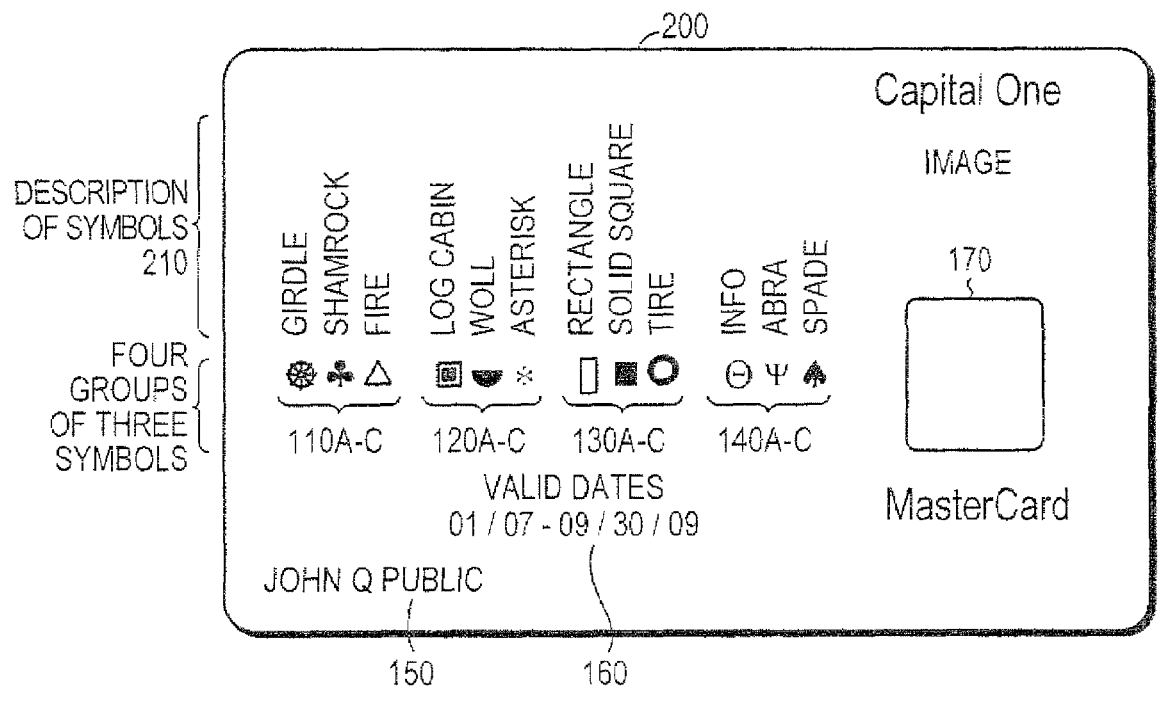
FIG. 2 is a schematic view of the front of another card that may be used in systems according to principles of the present invention.

FIG. 2 illustrates the front of another card 200 that may be used in systems according to principles of the present invention. The card of FIG. 2 contains the same elements as shown in FIG. 1, but also includes each symbol array individually labeled 210 to provide a user with instant identification of the symbols. By providing a written description of a symbol and/or its directional orientation, a user or vendor may more easily identify and enter the account information into the transactional system.

Figure 3A:
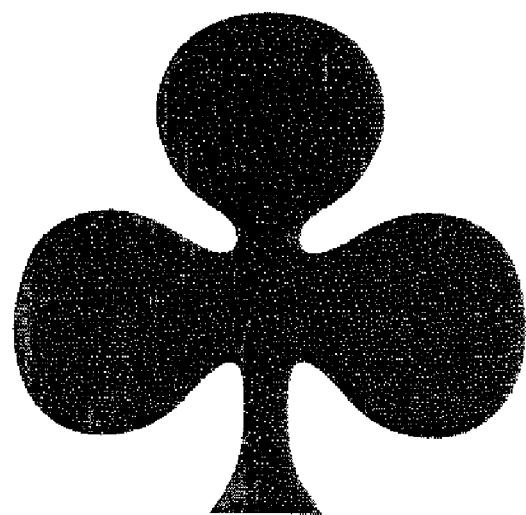
FIGS. 3A and 3B illustrate symbols in exemplary directional orientations that may be used in systems according to principles of the present invention.
Figure 3B:
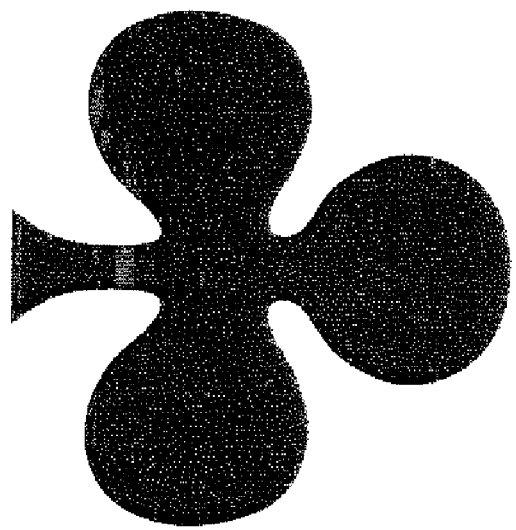
Figure 4:
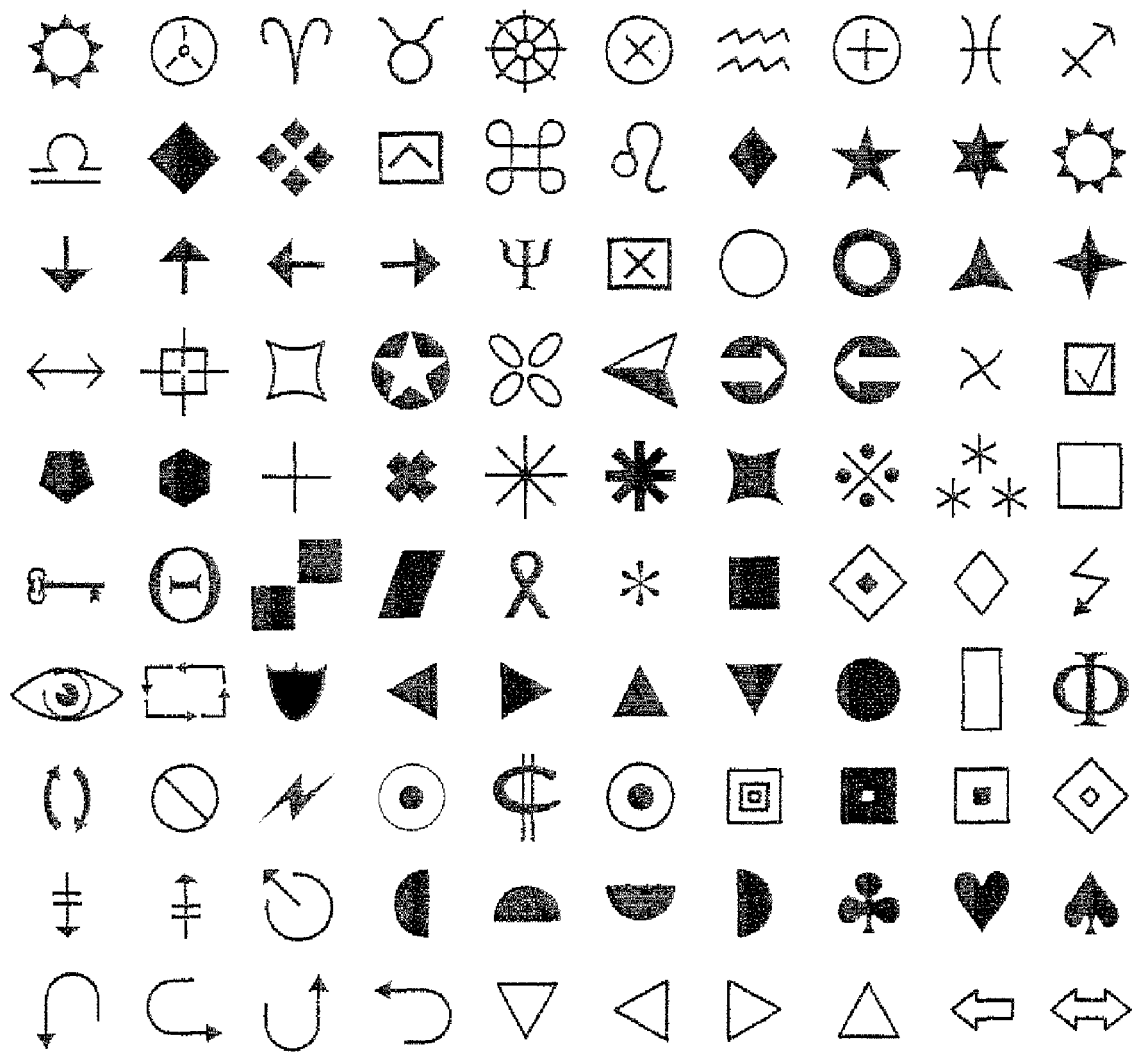
FIG. 4 is a symbol set that may be used in systems according to principles of the present invention.

One of ordinary skill in the art will recognize that many different symbol sets may be applied in accordance with principles of the present invention. The sets may be customized such that more than the 36 alpha numeric characters are available. Individual characters may be directionally oriented to provide even more possible combinations. For example, in FIG. 3A, a shamrock is shown oriented in the "North" pointing position, whereas the shamrock in FIG. 3B is shown oriented in the "East" pointing position. With various vendors employing their own distinctive symbol sets, a simple, yet supplementary layer of encryption may be provided to deter fraudulent transactions. For example, FIG. 4 shows an exemplary symbol set that may be used in connection with a system according to embodiments of the present invention. Other symbol sets ranging from less than 100 individual symbols to over 100 symbols may be utilized. As shown in the symbols of FIG. 4, depending on a symbol's symmetry, a given symbol may have one orientation (or directions), two orientations, or four orientations.

Figure 5:
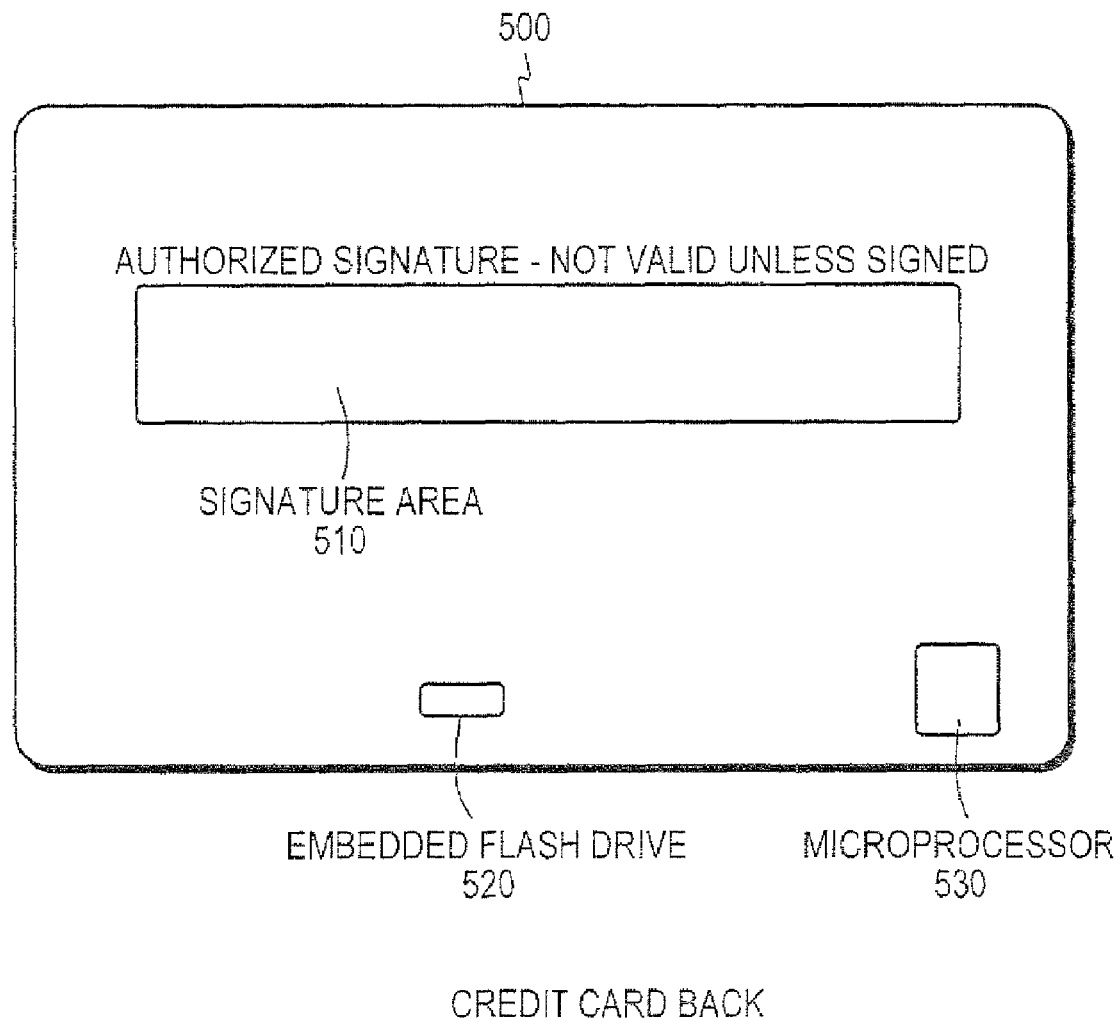
FIG. 5 is a schematic view of the back of another card that may be used in systems according to principles of the present invention.
Figure 6:
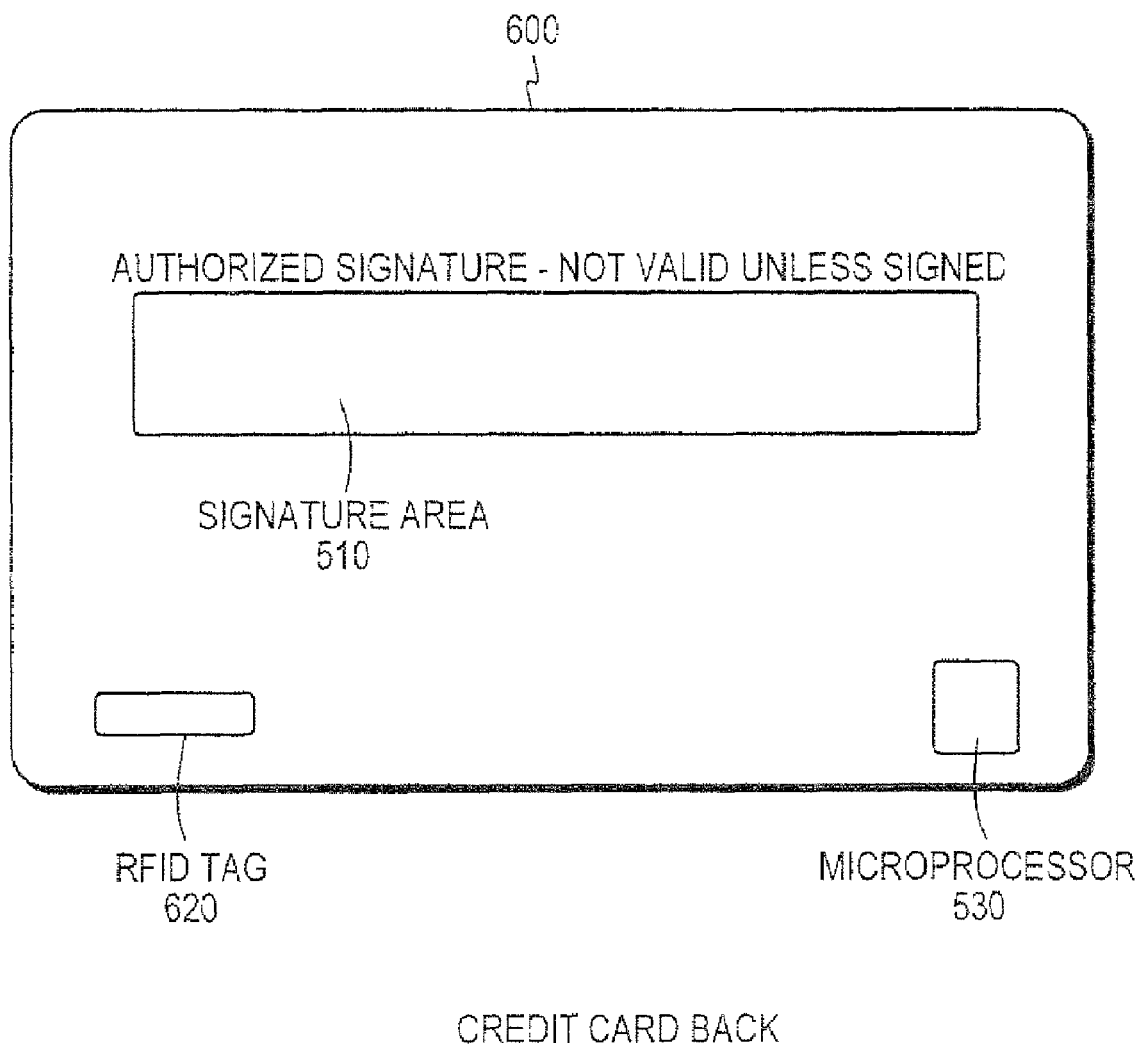
FIG. 6 is a schematic view of the back of another card that may be used in systems according to principles of the present invention.
Figure 7:
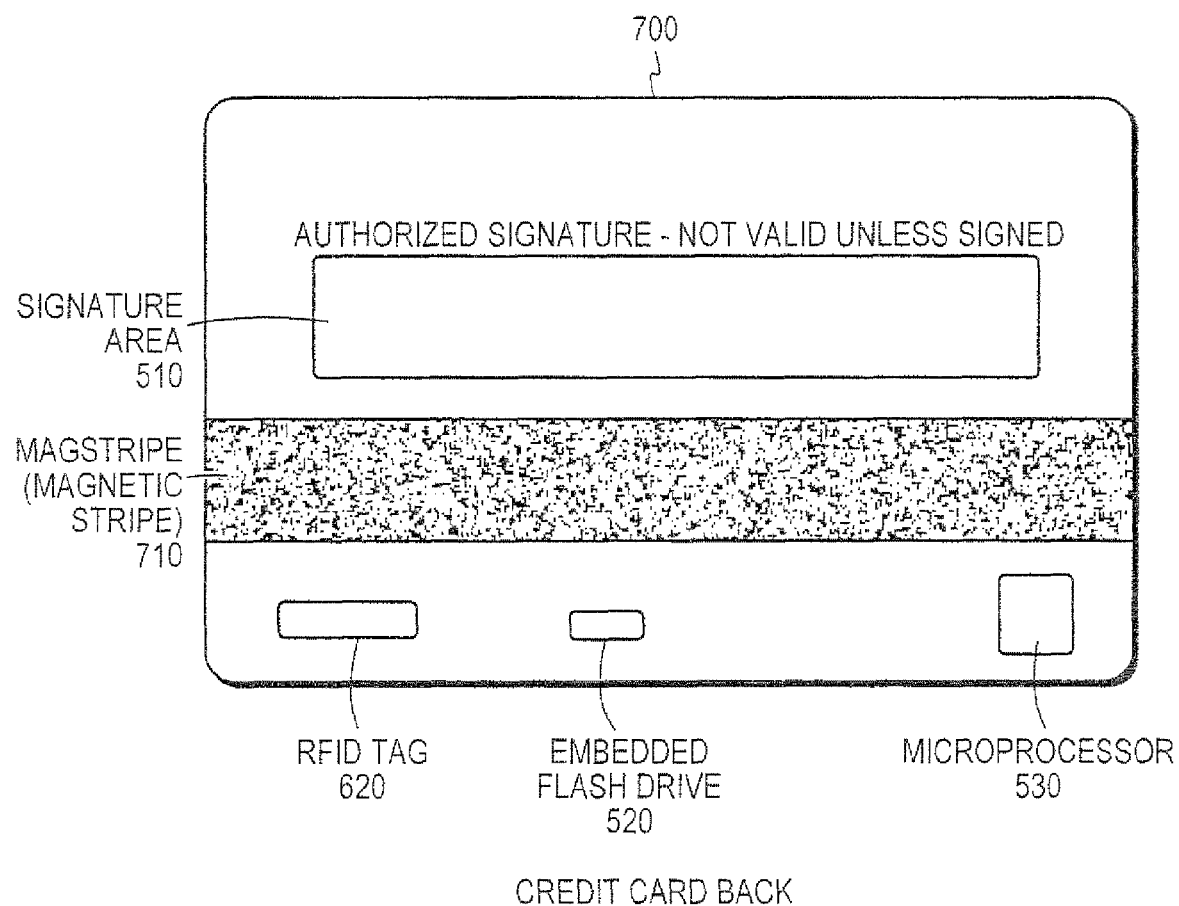
FIG. 7 is a schematic view of the back of another card that may be used in systems according to principles of the present invention.

FIGS. 5, 6 and 7 illustrate the backs of cards according to principles of the present invention. In FIG. 5, the back of a card 500 has a standard signature area 510 that provides a section for the user account holder to provide an authorized signature. In addition, the card includes an embedded flash drive 520, and a microprocessor 530. Flash drives or other non-volatile memory may hold account information corresponding to the symbol coded account identification data located on the front of the card. Alternatively, the flash drive 520 may store auxiliary information that provide additional security for any transaction with the card 500. In embodiments of the present invention discussed in further detail below, each individual symbol in the system may correspond to, or represent, an individual tone or sound that is coded in a database to create a match from the individual symbol to the individual tone or sound. The account identification data of a user may be stored in the flash drive 520. A microprocessor 530, such as a smart card and/or optical card processor, may be deployed within the card. This is accomplished using known techniques such as those by Zeit Controls by Zeit Controls BasicCard or other established manufacturing processes for smart card or optical card implementation into credit or debit card configurations.

FIG. 6 illustrates the back of another card that may be used in connection with the present invention. The card 600 includes an Radio Frequency Identification (RFID) tag 620 in addition a microprocessor 530. The RFID tag may be used in connection with acquisition systems employing RFID readers.

FIG. 7 illustrates the back of a yet another card 700 that may be used in connection with the present invention. In FIG. 7, the familiar magnetic stripe 710 still holds down its customary position on the back of the card in black or brown, and may store account information along with auxiliary symbol codes for security purposes. As with the other devices described above, corresponding audio information may also be stored upon the magnetic stripe of the card and passed with a modified ISO compliant scanner to the verification, banking or central cardholder databases. The magnetic stripe may also function solely as is traditionally applied with magnetic stripes using the 3 sections of data available for object code to be written onto them in a way which is completely compliant with ISO standards.

Figure 8:
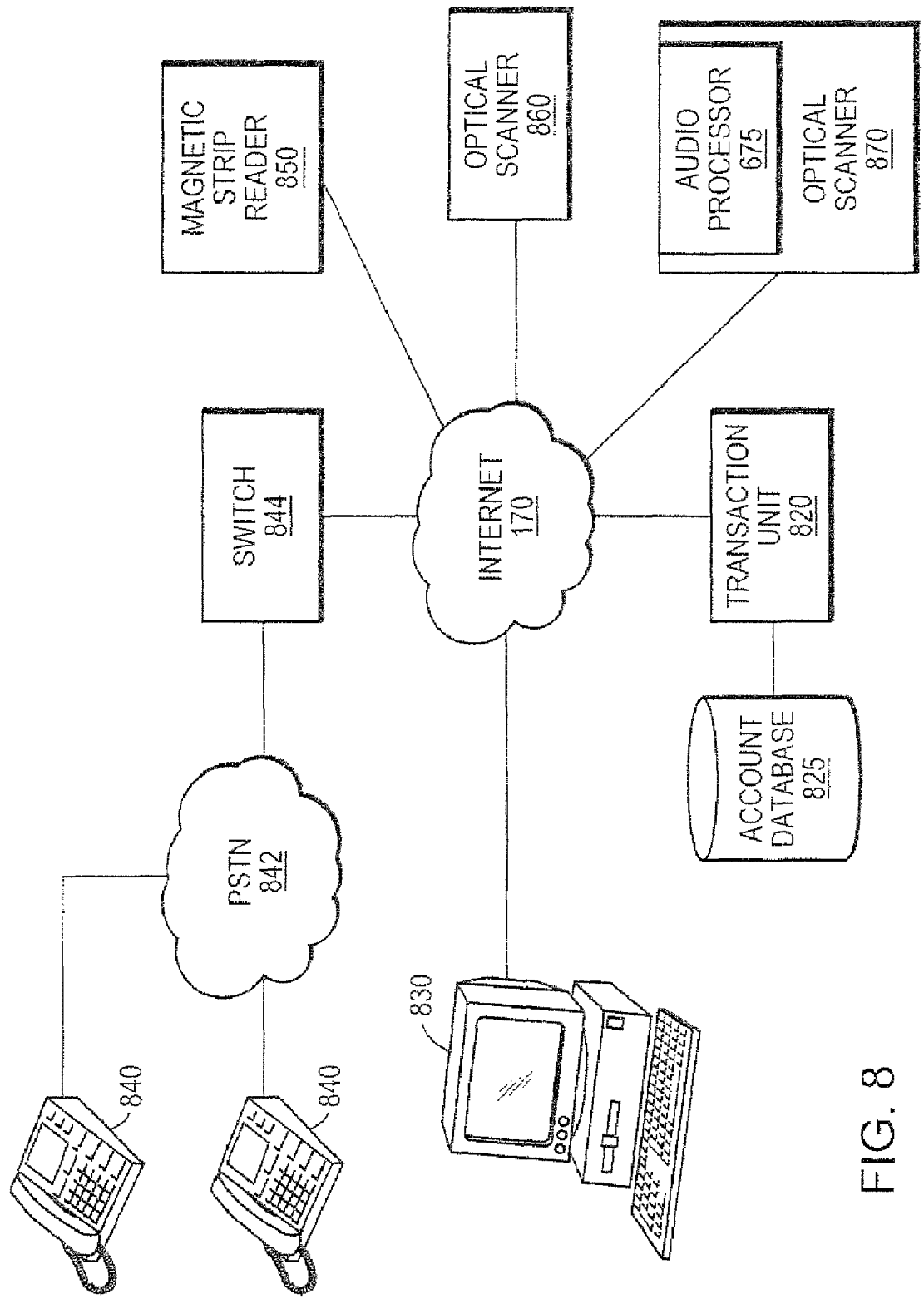
FIG. 8 is a block diagram of a system according to embodiments of the present invention.

FIG. 8 illustrates a system according to principles of the present invention. embodiments of the present invention provide coded access to a system by acquiring account identification data corresponding to a combination of a plurality of symbols. In an embodiment of the present invention, an acquisition unit such as a personal computer 830, a telephone 840, magnetic strip reader 850, an optical scanner 860, or a modified optical scanner 870 provides a user access point to a network 810 for transmitting a transaction request to a transaction unit 820. The transaction unit 820 may receive a request for access to a transactional system from an acquisition unit, the request including the account identification data. The transaction unit 820 may also be in communication with an account database 825, either local or remote, distributed, or central, or other configuration. The account database 825 may store user account information, such as account information for credit cardholders.

On a given card 100, 200, 500, 600, 700 each individual symbol may correspond to, or represent a respective tone or sound that is coded in a database, such as account database 825 of FIG. 8. The invention embodiment creates a match between the individual symbol and the respective tone or sound. In use, the individual tones or sounds are transferred to the database 825 after the sounds from the card have been read by the invention system. For example, audio data comprising a series of sounds may be entered into the system from telephone 840. The sounds may be entered as "touch tone" sounds from a telephone keypad, or as voice data read by a user. The reader system can be similar to a Dragon Systems technology that allows for the reading and matched tagging of sounds, similar to how voice tags are read and then matched by a cell phone for access to stored data. The combination of read sounds is then matched in the database 825 to corresponding symbols, which are then constructed in order to yield the symbol combination that comprises the debit or credit card holders' account code (account number of the card).

In other embodiments, an optical scanner 860 may acquire the series of symbols from a card and using image processing techniques, discriminate between the various symbols and their orientation within a system. In yet other embodiments a specialized optical scanner 870 may similarly acquire the series of symbols from a card, and convert the individual symbols into a series of sounds. The sounds or tones may be stored on an optical card whose data can be transmitted by an addition 675 to ISO compliant card scanners 870 in the form of a small ROM or RAM reader and storage system. Using these series of sounds as account identification data, the sounds may be sent through the network and matched at the transaction unit 820 with an account database 825. On skilled in the art will recognize that the account identification comprising sounds or tones representing each symbol may be stored on a smart card processor, which can hold this data along with other important data. The scanner may then utilize the readers' modem connection to pass on this information to the database.

One skilled in the art will recognize that the system shown in FIG. 8 illustrates a high level network, and that consistent with principles of the present invention, data transmissions for secure account verifications may be made in other network configurations at central and sub-central data and data verification points.

Figure 9:
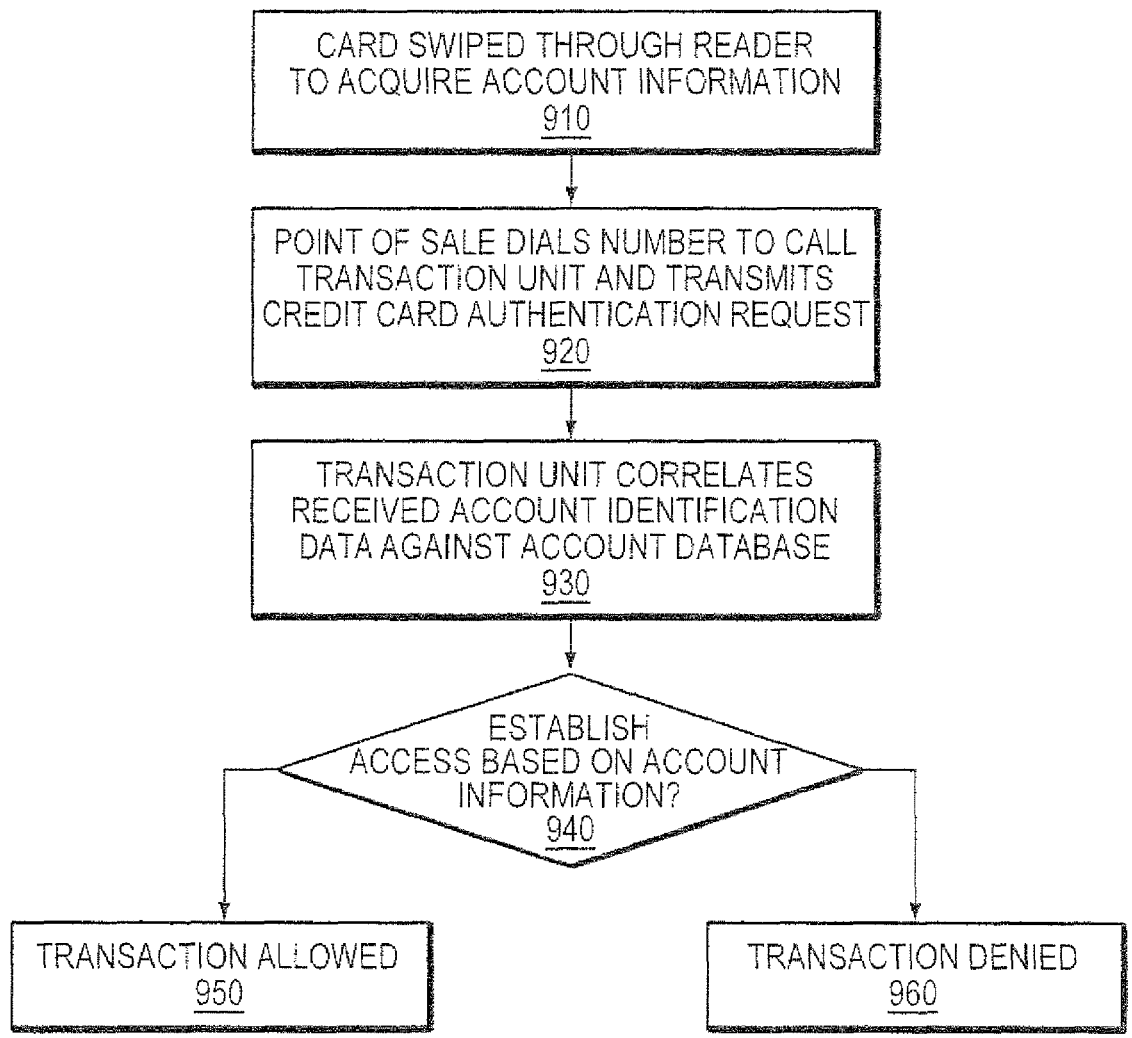
FIG. 9 is a flowchart illustrating an embodiment of the present invention.

FIG. 9 illustrates an exemplary transaction flow according to principles of the present invention. A consumer card holder seeking to make a purchase provides a vendor with a card. At step 910, the card is swiped though a reader, such as magnetic render 850 or optical scanner 860 of FIG. 8 to acquire account identification data corresponding to a combination of a plurality of symbols. At step 920, the point of sale vendor dials a number to call the transaction unit 820 and transmits the credit card authentication request, including the account information, through a network 810. At step 930, upon receiving a request for access to a transaction system, the transaction unit 820 of FIG. 8 may access the account database 825 and correlate the account identification data from a request with data in account database 825. At step 940, the transaction unit determines whether to establish access based on the correlation of the request against account database 825. Depending on any number of criteria determined by a transactional system, (e.g. account verification, credit limits, account status, stolen card status), the transaction will be allowed 950, or denied 960.

As discussed above, the request for a transaction may occur through any number of account acquisition units at a point of sale. For example, a telephone 840 may acquire the account identification data from a user and transmit the transaction request through a public switched telephone network (PSTN) 842 through a switch 844 to the network 810. In terms of online, phone or mail transactions, the user simply fills in the account number query by reading the printed names of the symbols off of the card in sequence, such as, "My account number is circle, north pointing shamrock, fire, log cabin, well, asterisk, rectangle and solid square."

Figure 10:
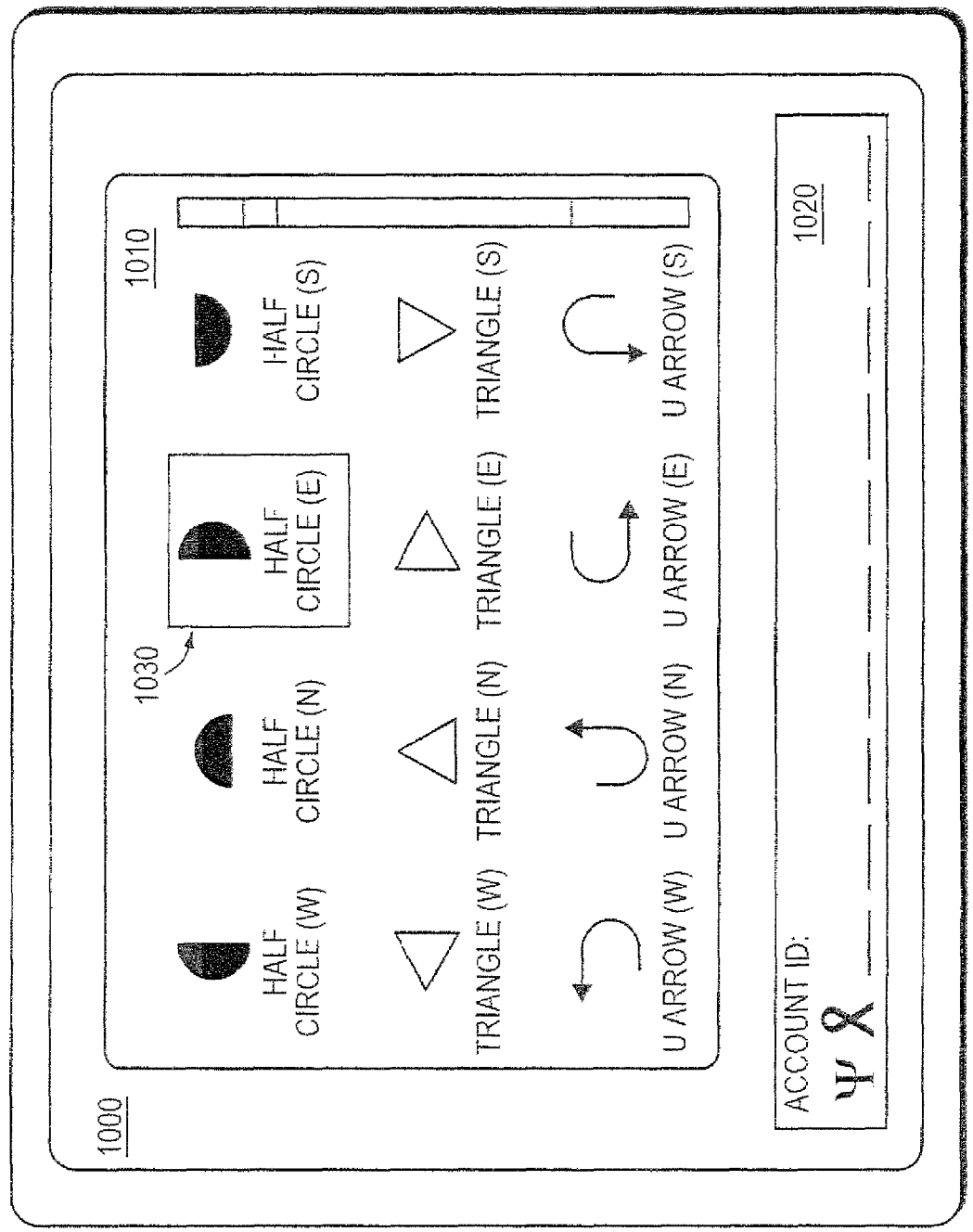
FIG. 10 is an illustration of the digital symbol visualizer that may be used at a visual acquisition unit according to principles of the present invention.

FIG. 10 illustrates a graphical user interface 1000 that may be used in connection with on-line transactions from a personal computer 830 of FIG. 8, or from any acquisition unit that may employ a graphical user interface such as an automated teller machine ("ATM"). Symbols may be selected from a special menu 1010 that lists all the symbols and provides fine display tools based upon an intuitive interface that provides for easy identification of characters. As a user scrolls through the organized symbol options/potential selections, he may select 1030 the symbols corresponding to his own account identification. In the user interface 1000 of FIG. 8, a separate frame or workspace 1020 for account identification shows to the user the symbol selections he has made. While using the GUI interface on-line or at an ATM, a built in memory to the symbol selection defines a symbol selection interface that can allow users to leave 'bread crumbs' to locate their symbol combinations in the future more fluidly and store and deploy their symbol account codes with a single click. Symbols can be located alphabetically, and/or with a Braille interface for visually impaired people or for people who simply prefer to locate their account numbers in this manner.

Those of ordinary skill in the art should recognize that methods involved in a method and system for providing coded access to a system may be embodied in a computer program product that includes a computer usable medium. For example, such a computer usable medium can include a readable memory device, such as a solid state memory device, a hard drive device, a CD-ROM, a DVD-ROM, or a computer diskette, having stored computer-readable program code segments. The computer readable medium can also include a communications or transmission medium, such as electromagnetic signals propagating on a computer network, a bus or a communications link, either optical, wired, or wireless, carrying program code segments as digital or analog data signals. The program code enables and supports computer implementation of the operations described in FIG. 9 or other embodiments.

While this invention has been particularly shown and described with references to example embodiments thereof, it will be understood by those skilled in the art that various changes in form and details may be made therein without departing from the scope of the invention encompassed by the appended claims.

For example, the foregoing describes, by way of illustration and not limitation, use of the present invention in financial transaction systems. Other systems in which the present invention may be employed include security systems (where the card provides a security ease code or security access number) and other systems having encoded user account-type numbers.

The foregoing refers to transactional system use/embodiment of the present invention. Other types of systems, e.g., security systems, identity verification systems and more, may also employ the present invention.

What is claimed is:

1. A method, comprising:
receiving, at an acquisition unit, account identification data corresponding to a plurality of non-alphanumeric symbols, wherein the account identification data comprises a written description specifying a rotational orientation for one or more of the plurality of non-alphanumeric symbols, and wherein both the written description and the corresponding non-alphanumeric symbols are displayed as part of receiving the account identification data;
correlating the account identification data against an account database to evaluate corresponding account information; and
controlling access to a transactional system based on the correlating.

2. The method of claim 1, wherein receiving account identification data comprises receiving audio data stored on an identification card, and wherein the non-alphanumeric symbols correspond to a different respective sound of the audio data.

3. The method of claim 1, wherein controlling access to a transactional system comprises controlling access to a credit card system, a debit card system, or a banking system.

4. The method of claim 1, wherein receiving account identification data includes receiving a combination of twelve symbols.

5. The method of claim 1, wherein receiving account identification data includes receiving the written description of the rotational orientation that comprises at least one of: up, down, left, or right.

6. The method of claim 1, wherein receiving account identification data includes receiving the written description of the rotational orientation that comprises at least one of: North or East.

7. A method, comprising:
obtaining, by an acquisition unit, account identification data from an account card;
transmitting a request for access to a transactional system, wherein the request comprises the account identification data including a plurality of non-alphanumeric symbols identifying an account, and wherein a written description including a rotational direction of one or more of the plurality of non-alphanumeric symbols is provided on the account card in addition to the plurality of non-alphanumeric symbols;

correlating the account identification data against an account database to evaluate corresponding account information; and controlling access to the transactional system based on the evaluated account information.

8. The method of claim 7, wherein obtaining account identification data includes obtaining audio data comprising a series of sounds, and wherein the non-alphanumeric symbols correspond to a different respective sound.

9. The method of claim 8, wherein obtaining the series of sounds comprises obtaining voice data.

10. The method of claim 8, wherein obtaining the series of sounds comprises obtaining one or more audio tones stored on the account card.

11. The method of claim 7, wherein controlling access to the transactional system comprises controlling access to a credit card system, a debit card system, or a banking system.

12. The method of claim 7, wherein transmitting a request includes transmitting representations of non-alphanumeric symbols that, in turn, comprise a combination of plural symbol arrays.

13. The method of claim 7, further comprising optically scanning the plurality of non-alphanumeric symbols from the account card.

14. The method of claim 13, further comprising:
identifying the optically scanned non-alphanumeric symbols in a database; and
automatically converting the optically scanned non-alphanumeric symbols into a series of sounds, wherein each sound in the series of sounds corresponds to a respective non-alphanumeric symbol in the database.

15. The method of claim 7, further comprising receiving the plurality of non-alphanumeric symbols from a graphical user interface.

16. The method of claim 7, wherein transmitting a request includes transmitting a representation of the written description in place of transmitting the non-alphanumeric symbols.

17. A non-transitory computer readable medium having stored thereon computer executable instructions that, in response to execution by one or more devices, cause the one or more devices to perform operations comprising:
scanning an account card to obtain account identification data, wherein the account identification data is stored as audio data on the account card;
transmitting the account identification data identifying one or more of a plurality of non-alphanumeric symbols displayed on the account card, wherein the audio data comprises an audio representation of the plurality of non-alphanumeric symbols;
correlating the account identification data against an account database to evaluate corresponding account information; and
controlling access to the account information in response to the correlating the account identification data.

18. The computer readable medium of claim 17, wherein the instructions are configured to cause the one or more devices to transmit the account identification data as the audio data.

19. The computer readable medium of claim 17, wherein the account identification data designates a rotational orientation of one or more of the plurality of non-alphanumeric symbols.

20. The computer readable medium of claim 19, wherein the instructions are configured to cause the one or more devices to associate a non-alphanumeric symbol oriented in a first rotational orientation with a first account, and wherein the instructions are further configured to cause the one or more devices to associate a non-alphanumeric symbol oriented in a second rotational orientation with a second account.

21. The computer readable medium of claim 17, wherein the instructions are configured to cause the one or more devices to store the audio data on a magnetic strip of the account card.

22. The method of claim 1, wherein the written description of the one or more non-alphanumeric symbols is displayed adjacent to a corresponding non-alphanumeric symbol on an identification card.

23. The method of claim 1, wherein receiving account identification data includes receiving non-alphanumeric symbols that are stored as audio data on an account card.

24. The method of claim 7, wherein obtaining account identification data includes obtaining audio data corresponding to the plurality of non-alphanumeric symbols.

25. The method of claim 7, wherein transmitting a request includes transmitting a request that includes the written description that is provided on the account card adjacent to the one or more non-alphanumeric symbols, and wherein the written description comprises a name of a corresponding non-alphanumeric symbol.

26. The method of claim 14, wherein transmitting a request for access comprises transmitting the series of sounds.

27. An apparatus, comprising:
means for scanning an account card to obtain account identification data, wherein the account identification data is stored as audio data on the account card;
means for transmitting the account identification data identifying one or more of a plurality of non-alphanumeric symbols displayed on the account card;
means for correlating the account identification data against an account database to evaluate corresponding account information; and
means for controlling access to the account information in response to the correlating the account identification data.

28. The apparatus of claim 27, wherein the account identification designates a rotational orientation of one or more of the plurality of non-alphanumeric symbols.

29. The apparatus of claim 27, wherein the audio data comprises an audio representation of the plurality of non-alphanumeric symbols.

30. The method of claim 1, further comprising displaying, by the acquisition unit, the written description and the corresponding non-alphanumeric symbols prior to receiving the account identification data.

* * * * *

UNITED STATES PATENT AND TRADEMARK OFFICE
CERTIFICATE OF CORRECTION

| | |
|---|---|
| PATENT NO. | : 7,938,318 B2 |
| APPLICATION NO. | : 11/695980 |
| DATED | : May 10, 2011 |
| INVENTOR(S) | : Fein et al. |

Page 1 of 1

It is certified that error appears in the above-identified patent and that said Letters Patent is hereby corrected as shown below:

Title page, item (75), under "Inventors", in Column 1, Line 1, delete "S" and insert -- S. --.

Signed and Sealed this
Ninth Day of August, 2011

David J. Kappos
*Director of the United States Patent and Trademark Office*